(12) United States Patent
Saber et al.

(10) Patent No.: US 11,228,900 B2
(45) Date of Patent: Jan. 18, 2022

(54) METHOD AND APPARATUS FOR DETERMINING UE CAPABILITY BASED ON NUMBER OF PROCESSED CHANNELS

(71) Applicant: Samsung Electronics Co., Ltd., Gyeonggi-do (KR)

(72) Inventors: Hamid Saber, San Diego, CA (US); Jungmin Park, Seoul (KR); Jung Hyun Bae, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/014,499

(22) Filed: Sep. 8, 2020

(65) Prior Publication Data

US 2021/0136565 A1    May 6, 2021

Related U.S. Application Data

(60) Provisional application No. 62/945,693, filed on Dec. 9, 2019, provisional application No. 62/929,643, filed on Nov. 1, 2019.

(51) Int. Cl.
| | |
|---|---|
| *H04W 8/24* | (2009.01) |
| *H04W 76/11* | (2018.01) |
| *H04L 1/00* | (2006.01) |
| *H04L 1/18* | (2006.01) |
| *H04W 72/04* | (2009.01) |

(Continued)

(52) U.S. Cl.
CPC ............ *H04W 8/24* (2013.01); *H04L 1/0003* (2013.01); *H04L 1/1819* (2013.01); *H04W 72/0446* (2013.01); *H04W 72/0493* (2013.01); *H04W 72/1257* (2013.01); *H04W 72/14* (2013.01); *H04W 76/11* (2018.02)

(58) Field of Classification Search
CPC ... H04W 8/24; H04W 76/11; H04W 72/0446; H04W 72/0493; H04W 72/1257; H04W 72/14; H04W 72/04; H04W 8/22; H04W 24/08; H04W 72/048; H04W 72/1263; H04W 72/1242; H04L 1/0003; H04L 1/1819
See application file for complete search history.

(56) References Cited

U.S. PATENT DOCUMENTS

| | | |
|---|---|---|
| 10,361,757 B2 | 7/2019 | Park et al. |
| 2018/0167933 A1 | 6/2018 | Yin et al. |
| 2019/0274032 A1 | 9/2019 | Chatterjee et al. |

(Continued)

OTHER PUBLICATIONS

3GPP TR 38.822 VI5.0.1 (Jul. 2019) 3rd Generation Partnership Project; Technical Specification Group Radio Access Network; NR; User Equipment (UE) feature list (Release 15).

(Continued)

*Primary Examiner* — Afshawn M Towfighi
(74) *Attorney, Agent, or Firm* — The Farrell Law Firm, P.C.

(57) ABSTRACT

An apparatus and method are provided for counting a number of uplink and/or downlink channels per slot for a UE capability in order to determine a maximum number of channels a UE is capable of processing per slot. A UE counts all PDSCHs or PUSCHs that the UE is scheduled or configured to receive or transmit, respectively, except for exception 1, exception 2, or exception 3, and generates UE capability information based on the counted number of the PDSCH or PUSCH per slot.

20 Claims, 8 Drawing Sheets

(51) Int. Cl.
*H04W 72/12* (2009.01)
*H04W 72/14* (2009.01)

(56) References Cited

U.S. PATENT DOCUMENTS

| | | |
|---|---|---|
| 2019/0289622 A1 | 9/2019 | Chatterjee et al. |
| 2019/0313429 A1* | 10/2019 | Cheng .................. H04W 8/24 |
| 2021/0051653 A1* | 2/2021 | Park ..................... H04W 8/22 |
| 2021/0067950 A1* | 3/2021 | Hosseini .......... H04W 72/1268 |

OTHER PUBLICATIONS

3GPP TR 38.824 V16.0.0 (Mar. 2019) 3rd Generation Partnership Project; Technical Specification Group Radio Access Network; Study on physical layer enhancements for NR ultra-reliable and low latency case (URLLC) (Release 16).

3GPP TS 38.306 V15.7.0 (Sep. 2019) 3rd Generation Partnership Project; Technical Specification Group Radio Access Network; NR: User Equipment (UE) radio access capabilities (Release 15).

\* cited by examiner

METHOD AND APPARATUS FOR DETERMINING UE CAPABILITY BASED ON NUMBER OF PROCESSED CHANNELS

PRIORITY

This application is based on and claims priority under 35 U.S.C. § 119(e) to U.S. Provisional Patent Application Ser. Nos. 62/929,643 and 62/945,693, which were filed in the United States Patent and Trademark Office on Nov. 1, 2019, and Dec. 9, 2019, respectively, the entire content of each of which is incorporated herein by reference.

FIELD

The present disclosure relates generally to counting a number of uplink and/or downlink channels per slot for a user equipment (UE) in order to determine a maximum number of channels the UE is capable of processing per slot.

BACKGROUND

For the 3rd Generation Partnership Project (3GPP) Release-16, discussions are ongoing regarding enhanced ultra-reliable low-latency communications (eURLLC), out-of-order (OoO) hybrid automatic repeat request (HARQ), collision handling between two unicast physical downlink shared channels (PDSCHs) or two different physical uplink shared channels (PUSCHs) are being discussed.

The 3GPP New Radio (NR) technical report (TR) 38.824 defines OoO operations including OoO HARQ and collision handling between two unicast PDSCHs or two different PUSCHs.

Generally, in 3GPP Release 15, intra-UE overlapping PDSCHs or PUSCHs in time or frequency are not allowed, although in Rel-16 such scenarios may be possible. For example, such overlapping scenarios may be beneficial for ultra-reliable low-latency communication (uRLLC) applications.

Two scenarios can be defined for the overlapping: scenario 1, in which two channels overlap only in time, and scenario 2, in which two channels overlapping in both time and frequency.

FIG. 1 illustrates a scenario in which two unicast PUSCHs overlap in time and frequency. Specifically, FIG. 1 illustrates an example of scenario 1.

Referring to FIG. 1, a collision occurs in the time domain between the last four slots (8-11) of an enhanced mobile broadband (eMBB) PUSCH of a first UL grant, and the first four slots of a uRLLC PUSCH of a second grant.

A collision event is often due to arrival of a high priority scheduling request (SR) for uRLLC. In this case, different UE capabilities can be defined to process one or both of the overlapping channels. According to one of the possible capabilities, a UE drops the processing of one of the channels based on an indicated priority. For example, a UE drops the processing of the first PDSCH or PUSCH, which normally corresponds to a lower priority service type, e.g., eMBB.

Dropping can also be done always or under some scheduling condition or as a UE capability.

Another scenario in which an uplink transmission may be dropped by a UE is when different uplink transmissions of two different UEs collide with each other, i.e., an inter-UE collision. In this scenario, typically, one of the uplink transmissions corresponds to a higher priority service type, e.g., a uRLLC, and the other one corresponds to eMBB.

Additionally, two uplink transmissions of the same UE may collide with each other, i.e., intra-UE collision. In this scenario, a higher priority channel is scheduled by a base station (e.g., a gNB) such that it overlaps with the previously scheduled uplink transmission.

In any of these scenarios, under specific scheduling conditions or as a UE capability, the UE can stop processing the lower priority channel. Similar to the downlink scheduling, a UE may drop a transmission, even if it does not overlap with any other transmission. For example, dropping can also be done if the two channels do not overlap in either time or in frequency, but still happen to be too close in the time domain, thereby making it too difficult for the UE to properly process both channels.

Dropping an uplink channel is already defined in Rel-15, and there are conditions under which a UE drops the uplink transmission or reception of a downlink channel. These conditions include when an uplink configured grant is to take place on symbols that a later slot format indicator (SFI) indicates as being downlink or flexible, or when a downlink configured grant is to take place on symbols that a later SFI indicates as being uplink or flexible.

A different scenario includes when on a capability 2 processing serving cell, a PDSCH is scheduled with more than 136 resource blocks (RBs). In this case, a UE defaults to capability 1 and may skip decoding the PDSCH if its last symbol is within 10 symbols before the start of a PDSCH scheduled with capability 2.

More specifically, 3GPP Release 15 provides:

If a UE is configured by higher layers to receive a channel state information reference signal (CSI-RS) or a PDSCH in a set of symbols of a slot and the UE detects a downlink control information (DCI) format 2_0 with a slot format value other than 255 that indicates a slot format with a subset of symbols from the set of symbols as uplink or flexible, or the UE detects a DCI format 0_0, DCI format 0_1, DCI format 1_0, DCI format 1_1, or DCI format 2_3 indicating to the UE to transmit a PUSCH, a physical uplink control channel (PUCCH), a sounding reference signal (SRS), or a physical random access channel (PRACH) in at least one symbol in the set of the symbols, the UE cancels the CSI-RS reception in the set of symbols of the slot or cancels the PDSCH reception in the slot.

If a UE is configured by higher layers to transmit an SRS, a PUCCH, a PUSCH, or a PRACH in a set of symbols of a slot and the UE detects a DCI format 2_0 with a slot format value other than 255 that indicates a slot format with a subset of symbols from the set of symbols as downlink or flexible, or the UE detects a DCI format 1_0, DCI format 1_1, or DCI format 0_1 indicating to the UE to receive a CSI-RS or a PDSCH in a subset of symbols from the set of symbols, then the UE does not expect to cancel the transmission in symbols from the subset of symbols that occur, relative to a last symbol of a control resource set (CORESET) where the UE detects the DCI format 2_0 or the DCI format 1_0 or the DCI format 1_1 or the DCI format 0_1, after a number of symbols that is smaller than the PUSCH preparation time $T\_(proc,2)$ for the corresponding PUSCH processing capability.

For UE processing capability 2 with scheduling limitation when $\mu=1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow capability 2, if any of those PDSCHs are scheduled with more than 136 RBs with 30 kHz subcarrier spacing (SCS) and following capability 1 processing time.

A UE capability feature group (FG), such as FG 5-11, 5-12, and 5-13 define the number of PDSCH or PUSCH a UE is capable of processing per slot. However, how to count a processed channel has not been defined. For example, it is not determined if a cancelled uplink channel should be counted towards this capability or not.

Accordingly, a need exists for specific methods to count the number of PDSCH or PUSCH per slot in order to determine a UE capability.

SUMMARY

The disclosure is made to address at least the problems and/or disadvantages described above and to provide at least the advantages described below.

An aspect of the disclosure is to provide a method and apparatus for counting a number of uplink and/or downlink channels per slot for a UE capability in order to determine a maximum number of channels a UE is capable of processing per slot.

Another aspect of the disclosure is to provide a method and apparatus for counting a number of uplink and/or downlink channels per slot for a UE capability, wherein any cancelled, scheduled, partially or fully dropped, configured grant uplink or downlink transmission is counted towards the UE capability.

Another aspect of the disclosure is to provide a method and apparatus for counting a number of uplink and/or downlink channels per slot for a UE capability, wherein a UE counts the uplink and/or downlink channels from a physical layer (PHY) or a medium access control (MAC) layer point of view, i.e., based on the whether or not the channel includes a transport block (TB).

In accordance with an aspect of the disclosure an apparatus of a user equipment (UE) is provided for counting a number of physical downlink shared channels (PDSCHs) or physical uplink shared channels (PUSCHs) per slot in order to determine a capability of the UE. The apparatus includes a transceiver; and a processor configured to count all PDSCHs or PUSCHs that the UE is scheduled or configured to receive or transmit, respectively, except for: exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least N_2 symbols after an end of the symbol i, the CG PUSCH is not counted, exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least N_2 symbols after an end of the symbol i, the CG PUSCH is not counted, or exception 3: when the UE receives a PDCCH, which ends in a symbol i, scheduling a PDSCH with a cell radio network temporary identifier (C-RNTI) or a modulation and coding scheme (MCS)-C-RNTI overlapping in time with a semi persistent scheduling (SPS) PDSCH starting in a symbol j in a same serving cell, wherein a beginning of the symbol j is at least N_2 symbols after an end of the symbol i, the SPS PDSCH is not counted, and generate UE capability information based on the counted number of the PDSCH or PUSCH per slot.

In accordance with another aspect of the disclosure, a method of a user equipment (UE) is provided for counting a number of physical downlink shared channels (PDSCHs) or physical uplink shared channels (PUSCHs) per slot in order to determine a capability of the UE. The method includes counting all PDSCHs or PUSCHs that the UE is scheduled or configured to receive or transmit, respectively, except for: exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least N_2 symbols after an end of the symbol i, the CG PUSCH is not counted, exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least N_2 symbols after an end of the symbol i, the CG PUSCH is not counted, or exception 3: when the UE receives a PDCCH, which ends in a symbol i, scheduling a PDSCH with a cell radio network temporary identifier (C-RNTI) or a modulation and coding scheme (MCS)-C-RNTI overlapping in time with a semi persistent scheduling (SPS) PDSCH starting in a symbol j in a same serving cell, wherein a beginning of the symbol j is at least N_2 symbols after an end of the symbol i, the SPS PDSCH is not counted; and generating UE capability information based on the counted number of the PDSCH or PUSCH per slot.

In accordance with another aspect of the disclosure, an apparatus of a base station is provided for counting a number of physical downlink shared channels (PDSCHs) or physical uplink shared channels (PUSCHs) per slot in order to determine a capability of a user equipment (UE). The apparatus includes a transceiver; and a processor configured to count all PDSCHs or PUSCHs that the UE is scheduled or configured to receive or transmit, respectively, except for: exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least N_2 symbols after an end of the symbol i, the CG PUSCH is not counted, exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least N_2 symbols after an end of the symbol i, the CG PUSCH is not counted, or exception 3: when the UE receives a PDCCH, which ends in a symbol i, scheduling a PDSCH with a cell radio network temporary identifier (C-RNTI) or a modulation and coding scheme (MCS)-C-RNTI overlapping in time with a semi persistent scheduling (SPS) PDSCH starting in a symbol j in a same serving cell, wherein a beginning of the symbol j is at least N_2 symbols after an end of the symbol i, the SPS PDSCH is not counted, and generate UE capability information based on the counted number of the PDSCH or PUSCH per slot.

In accordance with another aspect of the disclosure, a method of a base station is provided for counting a number of physical downlink shared channels (PDSCHs) or physical uplink shared channels (PUSCHs) per slot in order to determine a capability of a user equipment (UE). The method includes counting all PDSCHs or PUSCHs that the UE is scheduled or configured to receive or transmit, respectively, except for: exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least N_2 symbols after an end of the symbol i, the CG PUSCH is not counted, exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least N_2 symbols after an end of the symbol i, the CG PUSCH is not counted, or exception 3: when the UE receives a PDCCH, which ends in a symbol i, scheduling a PDSCH with a cell radio network temporary identifier (C-RNTI) or a modulation and coding scheme (MCS)-C-RNTI overlapping in time with a semi persistent scheduling (SPS) PDSCH starting in a symbol j in a same serving cell, wherein a beginning of the symbol j is at least N_2 symbols after an end of the symbol i, the SPS PDSCH is not counted; and generating UE capability information based on the counted number of the PDSCH or PUSCH per slot.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
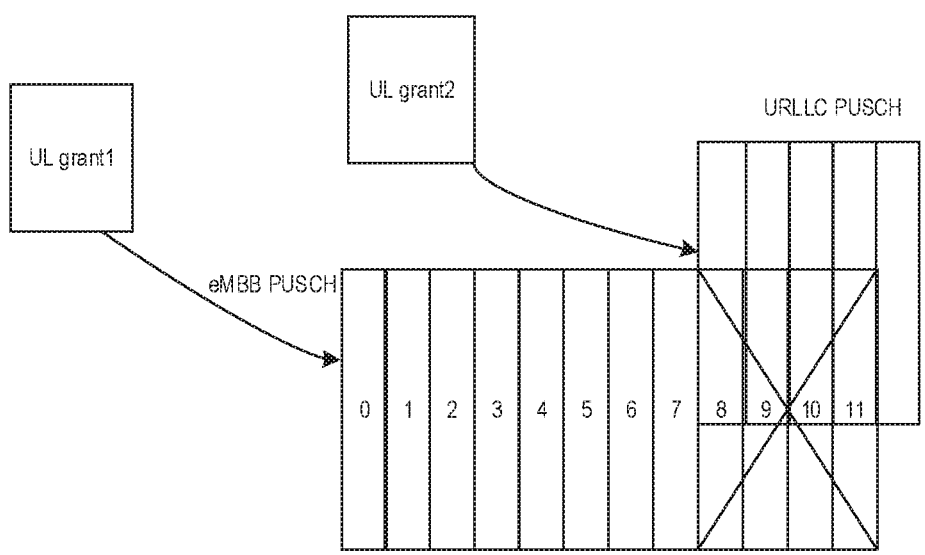
FIG. 1 illustrates a scenario in which two unicast PUSCHs overlap in time and frequency.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to an embodiment may be one of various types of electronic devices. An electronic device may include a portable communication device (e.g., a smart phone), a computer, a portable multimedia device, a portable medical device, a camera, a wearable device, or a home appliance. However, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, terms such as "1$^{st}$", "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

As described above, in the 3GPP specification, FG 5-11 to FG 5-13 define UE capabilities for processing uplink or downlink channels per slot. Further, 3GPP specification defines UE behavior to cancel an uplink or downlink transmission. However, the 3GPP specification does not specify how to count the cancelled channels or if counting channels should be based on the MAC layer or PHY layer.

As described below, the present disclosure provides different methods for counting the number of uplink and/or downlink channels per slot for a UE capability in order to determine a maximum number of channels that a UE is capable of processing per slot. In one embodiment, any cancelled, scheduled, partially or fully dropped, configured grant uplink or downlink transmission is counted towards the UE capability. In another embodiment, a UE counts the uplink and/or downlink channels form a PHY layer or MAC layer point of view, based on whether the channel includes a TB. According to these embodiments, UE processing complexity is reduced. That is, if a cancelled channel is not counted towards the capability, it will result in increased UE complexity and burden.

Counting the cancelled channels as a processed channel is also important from the baseband processing point of view, as resources are consumed for a cancelled channel. For example, processing components, such as a demodulator, channel estimator, decoder, etc., may be partially used for a cancelled channel. By counting the cancelled channels, UE complexity may be mitigated, thereby providing more flexibility towards processing other non-cancelled channels.

From a UE implementation point of view, completely processing a channel and dropping a channel may not precisely take the same amount of time or utilize the same hardware or software resources because when a UE drops a channel, it is often possible to empty the pipeline and processing elements, e.g., channel estimation, fast Fourier transform (FFT), demodulation, decoding, etc. However, to drop an already scheduled channel whose reception or transmission may be ongoing can still utilize a significant amount of processing resources on the UE transceiving chipset.

In 3GPP Rel-15, as part of a UE feature set, UE capabilities are defined to indicate the maximum number of PDSCHs or PUSCHs that a UE can process in one slot per serving cell.

Tables 1 and 2 below show some of the related NR UE features from TR 38.822 and TS 38.306 indicating the maximum number of PDSCH or PUSCH which a UE can process per slot.

TABLE 1

| Features | Index | Feature group | Components |
| --- | --- | --- | --- |
| 5. Scheduling/HARQ operation | 5-11 | Up to 2 unicast PDSCHs per slot per CC for different TBs for UE processing time Capability 1 | Up to 2 unicast PDSCHs per slot per CC only in TDM is supported for Capability 1 1) PDSCH(s) for Msg. 4 is included |
| | 5-11a | Up to 7 unicast PDSCHs per slot per CC for different TBs for UE processing time Capability 1 | Up to 7 unicast PDSCHs per slot per CC only in TOM is supported for Capability 1 1) PDSCH(s) for Msg. 4 is included |
| | 5-11b | Up to 4 unicast PDSCHs per slot per CC for different TBs for UE processing time Capability 1 | Up to 4 unicast PDSCHs per slot per CC only in TDM is supported for Capability 1 1) PDSCH(s) for Msg. 4 is included |
| | 5-12 | Up to 2 PUSCHs per slot per CC for different TBs for UE processing time Capability 1 | Up to 2 unicast PUSCHs per slot per CC only in TDM is supported for Capability 1 |
| | 5-12a | Up to 7 PUSCHs per slot per CC for different TBs for UE processing time Capability 1 | Up to 7 unicast PUSCHs per slot per CC only in TDM is supported for Capability 1 |
| | 5-12b | Up to 4 PUSCHs per slot per CC for different TBs for UE processing time Capability 1 | Up to 4 unicast PUSCHs per slot per CC only in TDM is supported for Capability 1 |
| | 5-13 | Up to 2 unicast PDSCHs per slot per CC for different TBs for UE processing time Capability 2 | Up to 2 unicast PDSCHs per slot per CC only in TDM is supported for Capability 2 UE can report values 'X' and supports the following operation, only when all carriers are self-scheduled and all Capability #2 carriers in a band are of the same numerology When configured with less than or equal to X DL CCs, the UE may expect to be scheduled with up to 2 PDSCHs per slot with Capability #2 on all of the configured serving cells for which processingType2Enabled is configured and set to enabled 2) No scheduling limitation 3) N1 based on Table 5.3-2 of TS 38.214 for given SCS from {15, 30, 60} kHz |

TABLE 1-continued

| Features | Index | Feature group | Components |
|---|---|---|---|
| | 5-13a | Up to 7 unicast PDSCHs per slot per CC for different TBs for UE processing time Capability 2 | Up to 7 unicast PDSCHs per slot per CC only in TDM is supported for Capability 2 UE can report values 'X' and supports the following operation, only when all carriers are self-scheduled and all Capability #2 carriers in a band are of the same numerology<br>When configured with less than or equal to X DL CCs, the UE may expect to be scheduled with up to 7 PDSCHs per slot with Capability #2 on all of the configured serving cells for which processingType2Enabled is configured and set to enabled<br>2) No scheduling limitation<br>3) N1 based on Table 5.3-2 of TS 38.214 for given SCS from {15, 30, 60} kHz |
| | 5-13c | Up to 4 unicast PDSCHs per slot per CC for different TBs for UE processing time Capability 2 | Up to 4 unicast PDSCHs per slot per CC only in TDM is supported for Capability 2 UE can report values 'X' and supports the following operation, only when all carriers are self-scheduled and all Capability #2 carriers in a band are of the same numerology<br>When configured with less than or equal to X DL CCs, the UE may expect to be scheduled with up to 4 PDSCHs per slot with Capability #2 on all of the configured serving cells for which processingType2Enabled is configured and set to enabled<br>2) No scheduling limitation<br>3) N1 based on Table 5.3-2 of TS 38.214 for given SCS from {15, 30, 60} kHz |
| | 5-13d | Up to 2 PUSCHs per slot per CC for different TBs for UE processing time Capability 2 | Up to 2 unicast PUSCHs per slot per CC only in TDM is supported for Capability 2 UE can report values 'X' and supports the following operation, only when all carriers are self-scheduled and all Capability #2 carriers in a band are of the same numerology<br>When configured with less than or equal to X UL CCs, the UE may expect to be scheduled with up to 2 PUSCHs per slot with Capability #2 on all of the configured serving cells for which processingType2Enabled is configured and set to enabled<br>2) N2 based on Table 6.4-2 of TS 38.214 for given SCS from {15, 30, 60} kHz |
| | 5-13e | Up to 7 PUSCHs per slot per CC for different TBs for UE processing time Capability 2 | Up to 7 unicast PUSCHs per slot per CC only in TDM is supported for Capability 2 1JE can report values 'X' and supports the following operation, only when all carriers are self-scheduled and all Capability #2 carriers in a band are of the same numerology<br>When configured with less than or equal to X UL CCs, the UE may expect to be scheduled with up to 7 PUSCHs per slot with Capability #2 on ail of the configured serving cells for which processingType2Enabled is configured and set to enabled<br>2) N2 based on Table 6.4-2 of TS 38.214 for given SCS from {15, 30, 60} kHz |
| | 5-13f | Up to 4 PUSCHs per slot per CC for different TBs for UE processing time Capability 2 | Up to 4 unicast PU SCHs per slot per CC only in TDM is supported for Capability 2 UE can report values 'X' and supports the following operation, only when all carriers are seif-scheduled and all Capability #2 carriers in a band are of the same numerology<br>When configured with less than or equal to X UL CCs, the UE may expect to be scheduled with up to 4 PUSCHs per slot with Capability #2 on all of the configured serving cells for which |

TABLE 1-continued

| Features | Index | Feature group | Components |
|---|---|---|---|
| | | | processingType2Enabled is configured and set to enabled<br>2) N2 based on Table 6.4-2 of TS 38.214 for given SCS from {15, 30, 60} kHz |

TABLE 2

| Definitions for parameters | Per | M | FDD-TDD DIFF | FR1-FR2 DIFF |
|---|---|---|---|---|
| pdsch-ProcessingType1-DifferentTB-PerSlot<br>Defines whether the UE capable of processing time capability 1 supports reception of up to two, four or seven PDSCHs for several transport blocks with PDSCH scrambled using C-RNTI, TC-RNT1, or CS-RNT1 in each of the applicable DL CCs within the same slot only in TDM. Note PDSCH(s) for Msg. 4 is included. | FS | No | No | No |
| pdsch-ProcessingType2<br>Indicates whether the UE supports PDSCH processing capability 2. The UE supports it only if all serving cells are self-scheduled and if all serving cells in one band on which the network configured processingType2 use the same subcarrier spacing. This capability signaling comprises the following parameters for each sub-carrier spacing supported by the UE.<br>fallback indicates whether the UE supports PDSCH processing capability 2 when the number of configured carriers is larger than numberOfCarriers for a reported value of differentTB-PerSlot. If fallback = 'sc', UE supports capability 2 processing time on lowest cell index among the configured carriers in the band where the value is reported, if fallback = 'cap1-only', UE supports only capability 1, in the band where the value is reported;<br>differentTB-PerSlot indicates whether the UE supports processing type 2 for 1, 2, 4 and/or 7 transport blocks per slot; and if so, it indicates up to which number of CA serving ceils tire UE supports that number of TBs. | FS | No | No | FR1 only |
| pusch-ProcessingType1-DifferentTB-PerSlot<br>Indicates whether the UE capable of processing time capability 1 supports transmission of up to two, four or seven PUSCHs for several transport blocks in each of the applicable UL CCs within the same slot only in TDM. | FS | No | No | No |
| pusch-ProcessingType2<br>Indicates whether the UE supports PUSCH processing capability 2. The UE supports it only if all serving cells are self-scheduled and if all serving cells in one band on which the network configured processingType2 use the same subcarrier spacing. This capability signaling comprises the following parameters for each sub-carrier spacing supported by the UE.<br>fallback indicates whether the UE supports PUSCH processing capability 2 when the number of configured carriers is larger than numberOfCarriers for a reported value of differentTB-PerSlot. If fallback = 'sc', UE supports capability 2 processing time on lowest cell index among the configured carriers in tire band where the value is reported, if fallback = 'cap1-only', UE supports only capability 1, in the band where the value is reported;<br>differentTB-PerSlot indicates whether the UE supports processing type 2 for 1, 2, 4 and/or 7 transport blocks per slot; and if so, it indicates up to which number of CA serving cells the UE supports that number of TBs. | FS | No | No | FR1 only |

While a UE may drop a lower priority channel, as described above and shown in Tables 1 and 2, it is not clear how to count the dropped PDSCH/PUSCH channels. For example, if a UE is capable of processing two PUSCHs per slot, and the scenario illustrated in FIG. 1 occurs, if a gNB counts the dropped PUSCH as one channel, it will count two PUSCHs overall, and therefore, will not schedule another channel in the same slot for the UE. However, if the dropped channel is not counted, the gNB may schedule another channel because the UE is capable of processing two PUSCHs per slot.

Because dropping PUSCHs and/or PDSCHs can still take a significant amount of time, and/or utilize significant hardware or software resources, according to an embodiment of the disclosure a dropped channel is counted as one processed channel in the above UE feature list, regardless of whether the channel has started being processed or not.

I. Dropping a Channel and Dynamic and Configured Grant Interaction

In the case of a DG PUSCH overlapping in time with a CG PUSCH, any type or a DG PDSCH overlapping in time with an SPS PDSCH, the configured grant PUSCH or the SPS PDSCH do not count towards the UE capability. This is based on a condition that there should be a sufficient time gap between the end of the DCI scheduling the DG PUSCH/PDSCH and the beginning of the CG-PUSCH/SPS-PDSCH in order for UE to be able to drop the transmission/reception of the CG-PUSCH/SPS-PDSCH. Herein, the phrase "the UE capability" may refer to FG 5-1, 5-11, 5-12, or 5-13 in 3GPP TR 38.822 or may refer to any other capability by which a UE reports the number of PUSCH or PDSCH per slot that it is capable of processing.

According to Embodiment 1, all PDSCHs/PUSCHs that a UE is scheduled or configured to receive/transmit are counted for the purpose of the UE capability, regardless of dynamically occurring dropping/cancellation/skip decoding of them, except for the following 3 cases. For the following cases, the DG PUSCH is prioritized over a the CG PUSCH and the DG PDSCH is prioritized over a configured SPS-PDSCH, and the dropped channels are not counted.

Case A: a UE receives a physical downlink control channel (PDCCH), which ends in symbol i, scheduling a DG-PUSCH that overlaps in time with a configured grant PUSCH starting in symbol j on the same serving cell, such that the beginning of symbol j is at least $N\_2$ symbols after the end of symbol i;

Case B: a UE receives a PDCCH, which ends in symbol i, scheduling a PUSCH on a serving cell for a given HARQ process number (HPN) and the UE is allowed to transmit a configured grant PUSCH with the same HPN starting in symbol j, such that the beginning of symbol j is at least $N\_2$ symbols after the end of symbol i; or Case C: a UE receives a PDCCH, which ends in symbol i, scheduling a PDSCH with a cell radio network temporary identifier (C-RNTI) or a modulation and coding scheme (MCS)-C-RNTI overlapping in time with an SPS PDSCH starting in symbol j in the same serving cell, such that the beginning of symbol j is at least $N\_2$ symbols after the end of symbol i.

For any of the above cases, a UE has enough time to cancel the CG PUSCH/PDSCH and prioritize the DG PUSCH/PDSCH. Therefore, the CG channel is not counted towards the UE capability. The cases in which the aforementioned timeline is not satisfied are considered as error cases.

Figure 2:
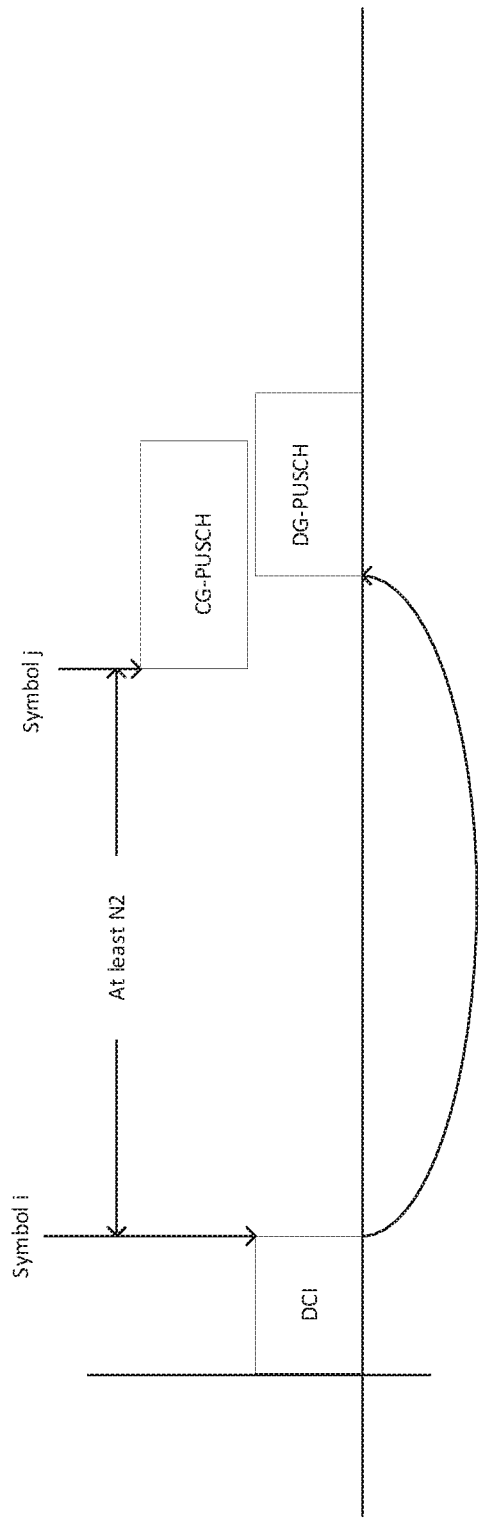
FIG. 2 illustrates Case A in which a dynamic grant (DG) PUSCH is prioritized over a configured grant (CG) PUSCH according to one embodiment.

FIG. 2 illustrates Case A in which a DG PUSCH is prioritized over a CG PUSCH according to one embodiment.

Referring to FIG. 2, a UE receives a PDCCH, which ends in symbol i and includes DCI scheduling a DG-PUSCH that overlaps in time with a CG PUSCH starting in symbol j on the same serving cell. Because the beginning of symbol j is at least $N\_2$ symbols after the end of symbol i, the UE has enough time to cancel the CG PUSCH and prioritize the DG PUSCH. Herein, the value of $N\_2$ can be set any suitable number that provides the UE enough time to cancel the CG PUSCH and prioritize the DG PUSCH.

Figure 3:
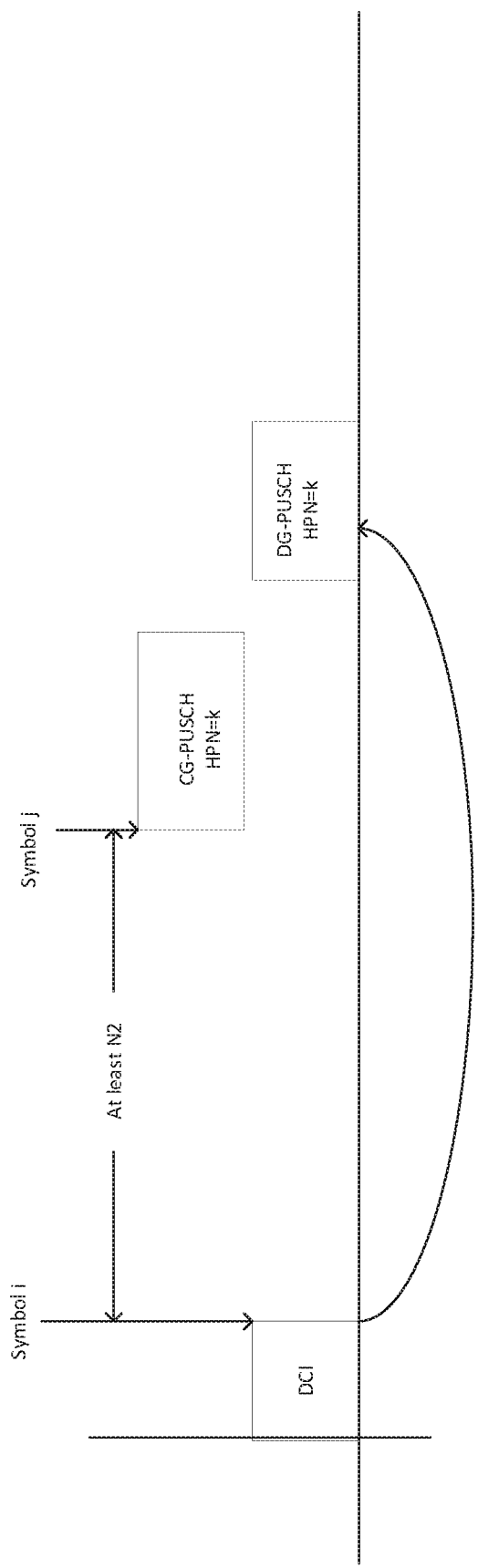
FIG. 3 illustrates Case B in which a DG PUSCH is prioritized over a CG PUSCH according to one embodiment.

FIG. 3 illustrates Case B in which a DG PUSCH is prioritized over a CG PUSCH according to one embodiment.

Referring to FIG. 3, a UE receives a PDCCH, which ends in symbol i and includes DCI scheduling a DG-PUSCH on a serving cell for a given HPN (e.g., HPN=k), while the UE is allowed to transmit a CG PUSCH with the same HPN starting in symbol j. Because the beginning of symbol j is at least $N\_2$ symbols after the end of symbol i, the UE has enough time to cancel the CG PUSCH and prioritize the DG PUSCH.

Figure 4:
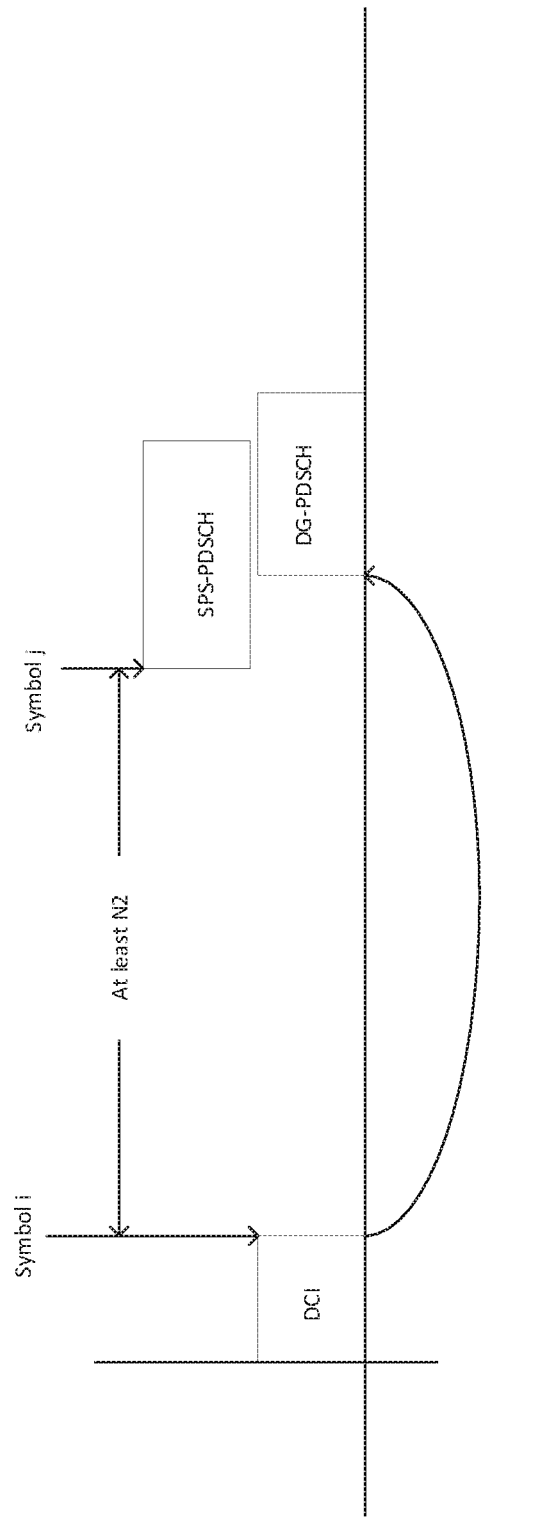
FIG. 4 illustrates Case C in which a DG PDSCH is prioritized over a configured semi persistent scheduling (SPS)-PDSCH according to one embodiment.

FIG. 4 illustrates Case C in which a DG PDSCH is prioritized over a configured SPS-PDSCH according to one embodiment.

Referring to FIG. 4, a UE receives a PDCCH, which ends in symbol i and includes DCI scheduling a DG PDSCH with a C-RNTI or an MCS-C-RNTI overlapping in time with an SPS PDSCH starting in symbol j in the same serving cell. Because the beginning of symbol j is at least $N\_2$ symbols after the end of symbol i, the UE has enough time to cancel the CG PUSCH and prioritize the DG PUSCH.

Figure 5:
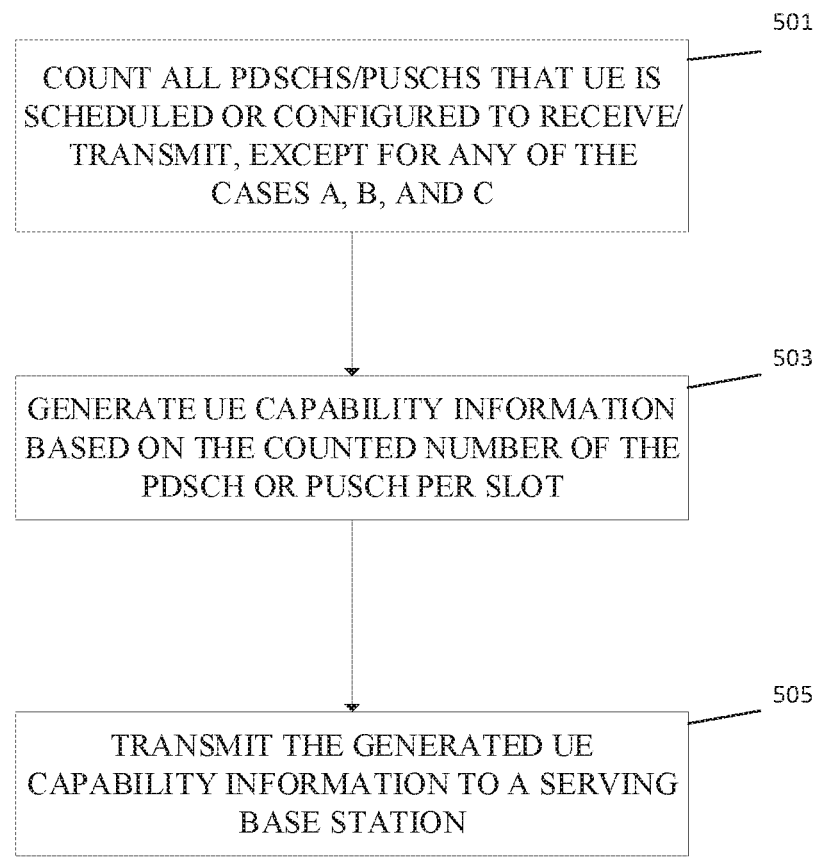
FIG. 5 is flow chart illustrating a method of a UE for counting a number of PDSCH or PUSCH per slot in order to determine a capability of the UE, according to one embodiment.

FIG. 5 is flow chart illustrating a method of a UE for counting a number of PDSCH or PUSCH per slot in order to determine a capability of the UE, according to one embodiment.

Referring to FIG. 5, in step 501, the UE counts all PDSCHs/PUSCHs that the UE is scheduled or configured to receive/transmit, except for any of the Cases A, B, and C described above.

In step 503, the UE generates UE capability information based on the counted number of the PDSCH or PUSCH per slot.

In step 505, the UE transmits the generated UE capability information to a serving base station.

Figure 6:
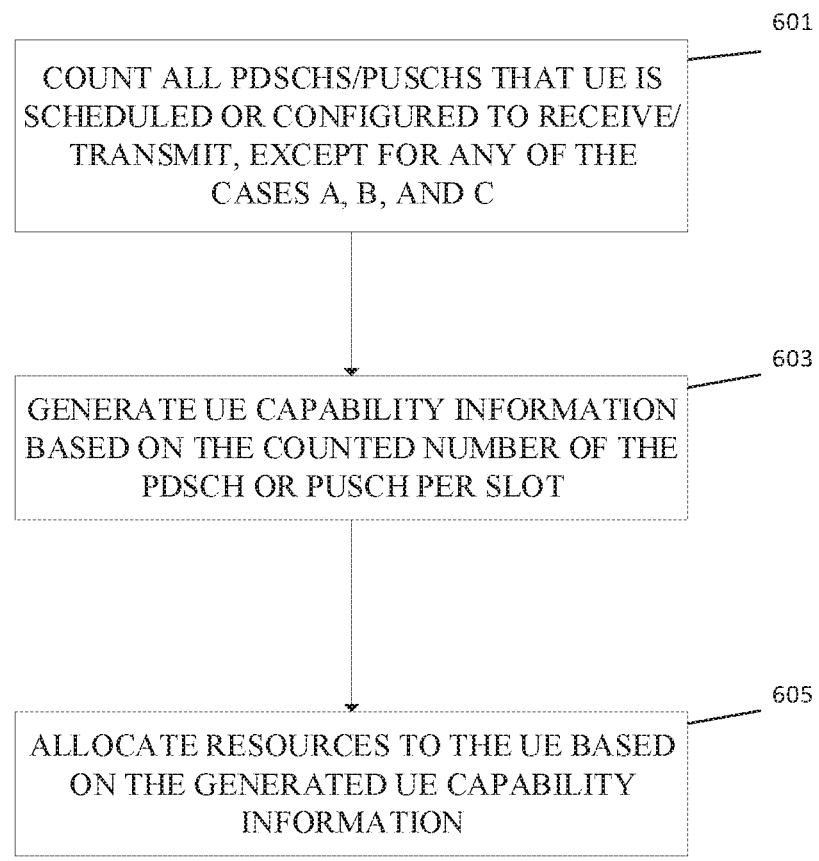
FIG. 6 is flow chart illustrating a method of a serving base station for counting a number of PDSCH or PUSCH per slot in order to determine a capability of a UE, according to one embodiment.

FIG. 6 is flow chart illustrating a method of a serving base station for counting a number of PDSCH or PUSCH per slot in order to determine a capability of a UE, according to one embodiment.

Referring to FIG. 6, in step 601, the serving base station counts all PDSCHs/PUSCHs that the UE is scheduled or configured to receive/transmit, except for any of the Cases A, B, and C described above.

In step 603, the serving base station generates UE capability information based on the counted number of the PDSCH or PUSCH per slot.

In step 605, the serving base station allocates resources to the UE based on the generated UE capability information.

According to Embodiment 2, all PDSCHs/PUSCHs that a UE is scheduled or configured to receive/transmit are counted for the purpose of UE capability, regardless of dynamically occurring dropping/cancellation/skip decoding of them.

For example, in the case of a DG PDSCH/PUSCH overlapping an SPS-PDSCH/CG-PUSCH, both the DG and SPS-PDSCH/CG-PUSCHs are counted towards the UE capability.

II. Whether Uplink/Downlink Transmission Includes a TB

In the above-described embodiments, the uplink/downlink transmissions in the slot are assumed to contain data. That is, the transmissions are assumed to transmit/receive one or more TBs. However, in the embodiments described below, PUSCH/PDSCH without TB may also be counted towards the UE capability as well.

According to Embodiment 3, all PDSCHs/PUSCHs that a UE is scheduled or configured to receive/transmit are counted for the purpose of UE capability, regardless of dynamically occurring dropping/cancellation/skip decoding and regardless of whether they convey a TB or not.

For example, a PUSCH without data (e.g., an uplink shared channel (UL-SCH)) is counted towards the UE capability. A PUSCH triggered to transmit an aperiodic CSI report is an example of such a PUSCH.

According to Embodiment 4, all PDSCHs/PUSCHs that a UE is scheduled or configured to receive/transmit are counted for the purpose of UE capability, regardless of dynamically occurring dropping/cancellation/skip decoding. However, the channels without a TB do not count towards the UE capability.

III. MAC-Based or PHY-Based Counting

Counting of a PDSCH or PUSCH towards the UE capability can be different from the viewpoint of MAC layer or the PHY layer. For example, when a CG-PUSCH overlaps with a DG-PUSCH (as illustrated in FIG. 2, Case A) and the DG-PUSCH is scheduled to carry an aperiodic-CSI report without any data, the DG-PUSCH does not include a TB. Therefore, from the PHY layer point of view, the DG-PUSCH should be counted as it is a PHY layer transmission anyways, regardless of whether it contains data or not. However, from the PHY layer point of view, the CG-PUSCH is not counted because the MAC layer has not delivered a TB for the CG-PUSCH. In general, there are two types of counting the channels towards the UE capability.

PHY-based counting: With PHY-based counting, the PDSCH/PUSCHs that the PHY layer are aware of are counted. That is, a PUSCH/PDSCH, with or without a TB, is counted towards the UE capability as long as the PHY layer is aware of them.

MAC-based counting: With MAC-based counting, the PDSCH/PUSCHs that the MAC layer is aware of are counted. That is, a PUSCH or PDSCH is counted towards the UE capability, if the corresponding TB is delivered to the PHY layer.

According to Embodiment 5, all PDSCHs/PUSCHs that a UE is scheduled or configured to receive/transmit are counted for the purpose of UE capability, based on the whether they are the CG or SPS channels as described in Embodiment 1 and/or whether or not they include a TB, according to Table 3 below.

As shown in Table 3, counting is done according to one of four possible methods.

TABLE 3

| Channel | Counting Method | | | |
| --- | --- | --- | --- | --- |
| | Method 1 | Method 2 | Method 3 | Method 4 |
| CG-PUSCH or SPS-PDSCH in Embodiment 1 | Do NOT count | Do NOT count | Count | Count |
| Without TB | Do NOT count | Count | Count | Do NOT count |

In Table 3, Method 1 is counted according to the MAC layer point of view. That is, when no TB is delivered for CG-PUSCH or SPS-PDSCH the channel is not counted. Also, when there is no TB for the physical channel, the channel is not counted.

In Method 2, counting is performed from the PHY layer point of view in that the CG-PUSCH/SPS-PDSCH is not delivered to the PHY layer for the CG-PUSCH and SPS-PDSCH. Also, from the PHY layer point of view, it does not matter if the channel includes a TB or not.

In Methods 3 and 4, depending on the amount of resources used in a PHY or MAC layer, different counting methods can be employed towards the UE capability.

Figure 7:
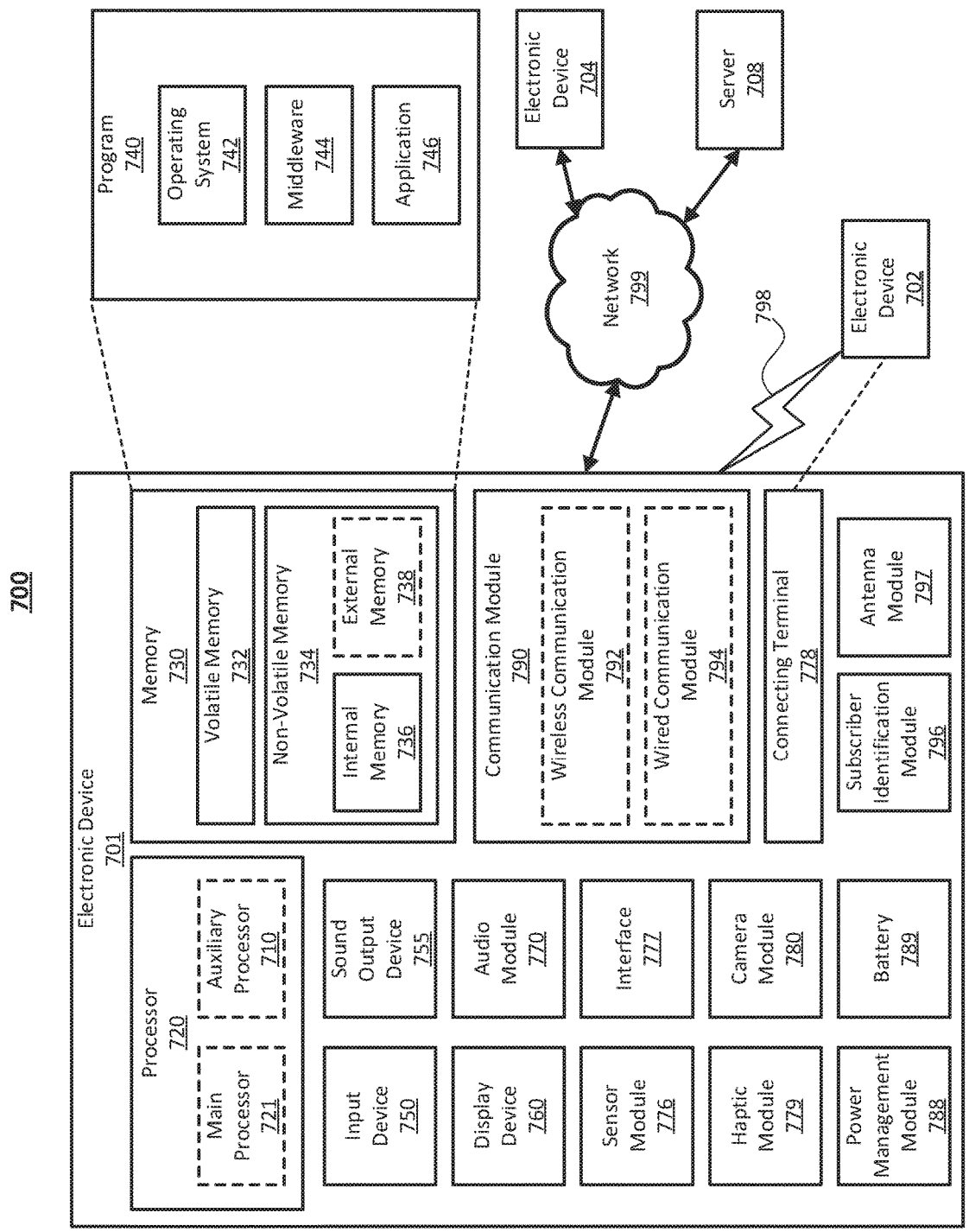
FIG. 7 illustrates an electronic device in a network environment, according to one embodiment.

FIG. 7 illustrates a block diagram of an electronic device 301 in a network environment 300, according to one embodiment.

Referring to FIG. 7, the electronic device 701 in the network environment 700 may communicate with another electronic device 702 via a first network 798 (e.g., a short-range wireless communication network), or another electronic device 704 or a server 708 via a second network 799 (e.g., a long-range wireless communication network). The electronic device 701 may also communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application).

According to one embodiment, the auxiliary processor 723 (e.g., an ISP or a CP) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, ISPs, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more CPs that are operable independently from the processor 720 (e.g., the AP) and supports a direct (e.g., wired) communication or a wireless communication.

According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

Figure 8:
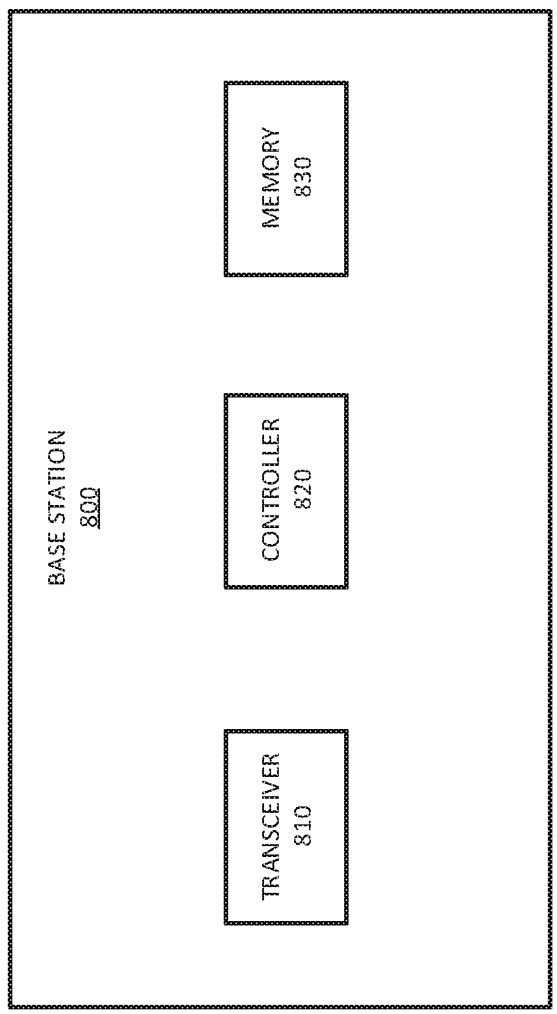
FIG. 8 illustrates a base station according to one embodiment.

FIG. 8 illustrates a base station according to one embodiment.

Referring to FIG. 8, the base station, e.g., a gNB, includes a transceiver 810, a controller 820, and a memory 830. The controller 820 may be defined as a circuit, an ASIC, or a processor. The transceiver 810 may transmit/receive a signal to/from another network entity. The transceiver 810 may transmit system information to, e.g., the UE, and may transmit a synchronization signal or a reference signal. Further, the transceiver may transmit and receive information related to initial access operation, random access operation, and handover operation to and from the UE.

The controller 820 may control the overall operation of the base station. The controller 420 may control to perform the operation according to the above-described flowchart of FIG. 6.

The memory 830 may store at least one piece of information transmitted/received through the transceiver 810 and information generated through the controller 820. For example, the memory 830 may store the counted number of PDSCHs/PUSCHs that the UE is scheduled or configured to receive/transmit.

The memory 830 may store a basic program for the operation of a communication processor, an application, and data such as configuration information. Further, the memory 830 may include at least one storage medium among a flash memory type, a hard disk type, a multimedia card micro type, a card type memory (e.g., an SD memory, an extreme digital (XD) memory, etc.), a magnetic memory, a magnetic disk, an optical disk, a random access memory (RAM), a static RAM (SRAM), a read only memory (ROM), a programmable ROM (PROM), and an electrically erasable PROM (EEPROM).

The controller 820 may perform various operations using a variety of programs, content, and data stored in the memory.

According to one embodiment, a method of the disclosure may be included and provided in a computer program product. The computer program product may be traded as a product between a seller and a buyer. The computer program product may be distributed in the form of a machine-readable storage medium (e.g., a compact disc ROM (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to the above-described embodiments, a system and method are provided for counting a number of uplink and/or downlink channels per slot for a UE capability in order to determine a maximum number of channels a UE is capable of processing per slot.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus of a user equipment (UE) for counting a number of physical downlink shared channels (PDSCHs) or physical uplink shared channels (PUSCHs) per slot in order to determine a capability of the UE, the apparatus comprising:
   a transceiver; and
   a processor configured to:
      count all PDSCHs or PUSCHs that the UE is scheduled or configured to receive or transmit, respectively, except for:
         exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least N_2 symbols after an end of the symbol i, the CG PUSCH is not counted,
         exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least N_2 symbols after an end of the symbol i, the CG PUSCH is not counted, or
         exception 3: when the UE receives a PDCCH, which ends in a symbol i, scheduling a PDSCH with a cell radio network temporary identifier (C-RNTI)

or a modulation and coding scheme (MCS)-C-RNTI overlapping in time with a semi persistent scheduling (SPS) PDSCH starting in a symbol j in a same serving cell, wherein a beginning of the symbol j is at least N_2 symbols after an end of the symbol i, the SPS PDSCH is not counted, and generate UE capability information based on the counted number of the PDSCH or PUSCH per slot.

2. The apparatus of claim 1, wherein the processor is further configured to transmit the generated UE capability information to a serving base station.

3. The apparatus of claim 1, wherein if exception 1 or exception 2 is applied, the processor is further configured to prioritize the DG PUSCH over the CG PUSCH.

4. The apparatus of claim 1, wherein if exception 3 is applied, the processor is further configured to prioritize the DG PDSCH over the configured SPS-PDSCH.

5. The apparatus of claim 1, wherein the processor is further configured to count all the PDSCHs or PUSCHs that the UE is scheduled or configured to receive or transmit.

6. The apparatus of claim 1, wherein the processor is further configured to count all the PDSCHs or PUSCHs that the UE is scheduled or configured to receive or transmit, except for channels that do not include a transport block (TB).

7. The apparatus of claim 1, wherein the processor is further configured to count the PDSCHs or PUSCHs that the UE is scheduled or configured to receive or transmit, using one of Methods 1 to 4 based on:

| Channel | Counting Method | | | |
| --- | --- | --- | --- | --- |
|  | Method 1 | Method 2 | Method 3 | Method 4 |
| Dropped CG-PUSCH or SPS-PDSCH | Do NOT count | Do NOT count | Count | Count |
| Without transport block (TB) | Do NOT count | Count | Count | Do NOT count |

8. A method of a user equipment (UE) for counting a number of physical downlink shared channels (PDSCHs) or physical uplink shared channels (PUSCHs) per slot in order to determine a capability of the UE, the method comprising:

counting all PDSCHs or PUSCHs that the UE is scheduled or configured to receive or transmit, respectively, except for:

exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least N_2 symbols after an end of the symbol i, the CG PUSCH is not counted, exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least N_2 symbols after an end of the symbol i, the CG PUSCH is not counted, or exception 3: when the UE receives a PDCCH, which ends in a symbol i, scheduling a PDSCH with a cell radio network temporary identifier (C-RNTI) or a modulation and coding scheme (MCS)-C-RNTI overlapping in time with a semi persistent scheduling (SPS) PDSCH starting in a symbol j in a same serving cell, wherein a beginning of the symbol j is at least N_2 symbols after an end of the symbol i, the SPS PDSCH is not counted; and generating UE capability information based on the counted number of the PDSCH or PUSCH per slot.

9. The method of claim 8, further comprising transmitting the generated UE capability information to a serving base station.

10. The method of claim 8, further comprising prioritizing the DG PUSCH over the CG PUSCH, if exception 1 or exception 2 is applied.

11. The method of claim 8, further comprising prioritizing the DG PDSCH over the configured SPS-PDSCH, if exception 3 is applied.

12. An apparatus of a base station for counting a number of physical downlink shared channels (PDSCHs) or physical uplink shared channels (PUSCHs) per slot in order to determine a capability of a user equipment (UE), the apparatus comprising:

a transceiver; and
a processor configured to:
count all PDSCHs or PUSCHs that the UE is scheduled or configured to receive or transmit, respectively, except for:

exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least N_2 symbols after an end of the symbol i, the CG PUSCH is not counted, exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least N_2 symbols after an end of the symbol i, the CG PUSCH is not counted, or exception 3: when the UE receives a PDCCH, which ends in a symbol i, scheduling a PDSCH with a cell radio network temporary identifier (C-RNTI) or a modulation and coding scheme (MCS)-C-RNTI overlapping in time with a semi persistent scheduling (SPS) PDSCH starting in a symbol j in a same serving cell, wherein a beginning of the symbol j is at least N_2 symbols after an end of the symbol i, the SPS PDSCH is not counted, and generate UE capability information based on the counted number of the PDSCH or PUSCH per slot.

13. The apparatus of claim 12, wherein the processor is further configured to allocate resources to the UE based on the generated UE capability information.

14. The apparatus of claim 12, wherein if exception 1 or exception 2 is applied, the processor is further configured to prioritize the DG PUSCH over the CG PUSCH.

15. The apparatus of claim 12, wherein if exception 3 is applied, the processor is further configured to prioritize the DG PDSCH over the configured SPS-PDSCH.

16. The apparatus of claim 12, wherein the processor is further configured to count all the PDSCHs or PUSCHs that the UE is scheduled or configured to receive or transmit.

17. The apparatus of claim 12, wherein the processor is further configured to count all the PDSCHs or PUSCHs that the UE is scheduled or configured to receive or transmit, except for channels that do not include a transport block (TB).

18. The apparatus of claim 12, wherein the processor is further configured to count the PDSCHs or PUSCHs that the UE is scheduled or configured to receive or transmit using one of Methods 1 to 4 based on:

| | Counting Method | | | |
|---|---|---|---|---|
| Channel | Method 1 | Method 2 | Method 3 | Method 4 |
| Dropped CG-PUSCH or SPS-PDSCH | Do NOT count | Do NOT count | Count | Count |
| Without transport block (TB) | Do NOT count | Count | Count | Do NOT count |

19. A method of a base station for counting a number of physical downlink shared channels (PDSCHs) or physical uplink shared channels (PUSCHs) per slot in order to determine a capability of a user equipment (UE), the method comprising:

counting all PDSCHs or PUSCHs that the UE is scheduled or configured to receive or transmit, respectively, except for:

exception 1: when the UE receives a physical downlink control channel (PDCCH), which ends in a symbol i, scheduling a dynamic grant (DG)-PUSCH that overlaps in time with a configured grant (CG) PUSCH starting in a symbol j on a same serving cell, wherein a beginning of the symbol j is at least $N\_2$ symbols after an end of the symbol i, the CG PUSCH is not counted, exception 2: when the UE receives a PDCCH, which ends in a symbol i, scheduling a PUSCH on a serving cell for a hybrid automatic repeat request (HARQ) process number (HPN), and the UE is allowed to transmit a CG PUSCH with the same HPN starting in a symbol j, wherein a beginning of the symbol j is at least $N\_2$ symbols after an end of the symbol i, the CG PUSCH is not counted, or exception 3: when the UE receives a PDCCH, which ends in a symbol i, scheduling a PDSCH with a cell radio network temporary identifier (C-RNTI) or a modulation and coding scheme (MCS)-C-RNTI overlapping in time with a semi persistent scheduling (SPS) PDSCH starting in a symbol j in a same serving cell, wherein a beginning of the symbol j is at least $N\_2$ symbols after an end of the symbol i, the SPS PDSCH is not counted; and generating UE capability information based on the counted number of the PDSCH or PUSCH per slot.

20. The method of claim 19, further comprising allocating resources to the UE based on the generated UE capability information.

* * * * *